Patented Sept. 6, 1938

2,129,047

UNITED STATES PATENT OFFICE 2,129,047

SMOKE FLAVORING CONDIMENT

Saladine E. Colgin, Dallas, Tex.

No Drawing. Application June 16, 1934,
Serial No. 730,997

3 Claims. (Cl. 99—223)

This invention relates to a condimental substance designed to be incorporated as an ingredient of sauces or to be employed in the cooking or table preparation of foodstuffs and particularly meats, for imparting to them the well known "barbecue" or smoke flavor characteristic of comestibles and particularly meats which have been subjected to the condensation of natural smoke from a hickory fire.

One of the objects of the invention is to produce a condiment of this character inexpensive to manufacture, wholesome in nature and which can be applied with gratifying results to small quantities of meat or other foodstuffs by persons whose skill does not exceed that of the average housewife.

Another object of the invention is the derivation of a condiment of the class described from pyroligneous acid, so treated and modified as to have retained the desirable flavoring principles and to have been freed from those substances inimical to the wholesomeness and flavor of the condiment.

Preservative preparations for meats commercialized under names such as "liquid smoke" are known, these generally consisting essentially of conventionally refined pyroligneous acid. Such preparations are generally ordinarily effective for the intended purpose, being applied by brushing or painting on the surface of the meat, or sometimes injected into the meat with a syringe. In any event, the meat is put away to cure, for weeks or months, in which time certain undesirable volatile constituents will have evaporated, and in the end, the meat is subjected to a more or less lengthy period of cooking at an elevated temperature which drives out or chemically alters most of the non-volatile unwanted flavoring elements, so that the meat when eaten is fairly simulative of a naturally smoked product.

When used as a condiment however, pyroligneous acid does not have the benefit of time nor exposure to air to permit volatilization of any of its substances, nor is it generally applied to the food until near the end or after the completion of the cooking period, so that it does not have the advantage of a high or protracted heat.

It follows therefore that the production of an eligible smoke flavoring condiment requires that the pyroligneous acid be put through a novel refining process in which not only are those deleterious substances removed which ordinarily disappear through volatilization and the prolonged heat of cooking, but also those principles are conserved which carry the desired flavor.

It is of course known that pyroligneous acid is an aqueous distillate formed by heating certain woods to within a temperature range of 160° C. to 275° C., the acid containing a great many substances including methyl alcohol, acetic acid, acetone, and phenolic compounds such as guaiacal, creosote, creosol and carbolic acid.

Certain of these substances are altogether objectionable from the standpoint of human alimentation. As examples of such substances, one may refer to methyl alcohol which is readily eliminated by distillation, and certain of the phenols which being non-volatile tarry substances, must be otherwise removed.

The constituents from which the desired smoke flavor is derived are among the heavier or tarry substances, but fortunately the flavoring principle is soluble in the lighter liquids, and the tars can therefore be eliminated without losing the smoke flavor. Heating, for elimination of the methyl alcohol and other volatile unwanted substances must however be carried on at a critical temperature or the smoke flavor will be lost.

To accomplish the removal of the tarry matters which are held in suspension in the pyroligneous acid, I prefer to employ a deflocculating agent such as common table salt which readily goes into solution with the aqueous content of the pyroligneous acid and precipitates the tarry substances. The pyroligneous acid may then be decanted. Before heating it for the purpose of driving out the undesired volatile substances, I prefer to treat it with caramel which fixes or absorbs the smoke flavor. The filtrate after having been treated with the caramel is distilled at a temperature not greatly exceeding 102° C. The heating causes the methyl alcohol, and such aldehydes, ketones and other undesirable substances usually found in crude pyroligneous liquor to be distilled off. The resulting residue is then cooled, filtered and stored in charred wood containers where it is permitted to age for a period of three or more months. What takes place in the course of ageing is not definitely known even to those skilled in the art, but the changes which occur are presumed to be analogous to those which take place in the ageing of alcoholic liquors and are decidedly beneficial to the flavor of the finished product.

Example

*First step.*—To any desired volume of pyroligneous acid there is added and thoroughly mixed with the acid from 1% to 5% of salt according to the tarriness of the acid. The mixture is thoroughly agitated. Deflocculation occurs and the solid or tarry ingredients are precipitated. The liquor is then decanted and filtered before being subjected to the next step. Filtration while preferred, is not essential to the process.

*Second step.*—To the liquor decanted in the first step, there is added from 10% to 15% of caramel preferably glucose caramel. This is mixed thoroughly with the pyroligneous acid. The resulting mixture is then placed in a still, preferably glass, and subjected to a temperature of 102° C. for a period of about three hours. This heating step causes approximately 30% of the liquor to pass over, thereby removing aldehydes, ketones, alcohol, methyl acetone, and other disagreeable and deleterious substances native to the crude pyroligneous liquor and aging the product. It is preferred to use a glass still in carrying out this step of the process in order to avoid the formation of undesirable metallic compounds which might take place if the reaction were carried out in a metallic still. At the end of the distillation period the residue is cooled and filtered and stored in charred wood containers where it is allowed to age for a period of three or more months.

The step of adding salt to the crude pyroligneous acid in separating the solids or tarry matters from the liquid of suspension is considered essential to the process inasmuch as it is selective to the extent that those smoke flavor principles which are inherent in the tarry residues are at the time in aqueous solution in the pyroligneous liquor and therefore are retained in the decanted liquid.

The addition of caramel and preferably glucose caramel before distillation is also considered essential inasmuch as it makes a more homogeneous compound and serves as a binder to absorb or hold intact the smoke flavoring substances during the process of distilling.

The condimental substance produced by my novel process can be added to any spice or spices, or other seasoning substances, vegetable or fruit juices or any combination of such substances when a smoke flavor is desired. It can also be added to any kitchen or table sauce to impart the smoke flavor which it can be used as an ingredient of gravies, soups, vegetable dishes of all kinds and meats of all kinds when a smoke flavor similar to smoked ham, bacon or barbecue is desired. It will impart the same smoke flavor as though the foodstuff to which it is applied were cooked over a smouldering wood fire.

The most decided advantage residing in the use of this condiment is that it can be applied to ordinary small roasts of meats or fowl in the household kitchen with the assurance of satisfactory results even though the experience of the person applying the same is limited.

It will be apparent that this condiment can be bottled and preserved indefinitely for use whenever desired and that it will instantly impart the highly desirable flavor to foodstuffs, without awaiting the usual curing time or subject it to the long cooking period essential to obtain the proper flavor from the ordinary so-called "liquid smokes." The contrast between the ordinary basting of meats with this smoke flavored condiment and the old processes of smoke curing by hanging meats in smoke houses is so great that the desirability of this novel condiment will be obvious to any person who has occasion to observe the methods of cooking meats in household quantities and by the ordinary methods of barbecuing.

What I claim is:

1. The process of manufacturing a smoke flavoring condimental substance from pyroligneous liquor comprising adding sodium chloride to the liquor to precipitate solids and tarry matters from said liquor, separating the liquor from the precipitate, mixing caramel with the separated liquor for the purpose of absorbing and holding the smoke flavoring principle, distilling the mixture of caramel and liquor until the volatile aldehydes, ketones, acetone and other undesired volatile ingredients have been removed and aging the product.

2. The process of manufacturing a smoke flavoring condimental substance from pyroligneous liquor comprising adding sodium chloride to the liquor to precipitate solids and tarry matters from said liquor, separating the liquor from the precipitate, mixing caramel with the separated liquor for the purpose of binding and holding the smoke flavoring principle, then distilling the mixture of caramel and liquor at a temperature of about 102° C., until the volatile aldehydes, ketones, acetone and other undesired volatile ingredients have been removed and aging the product.

3. The process of manufacturing a smoke flavoring condimental substance from pyroligneous liquor comprising adding sodium chloride to the liquor, to precipitate the solid and tarry matters, separating the liquor from the precipitate, mixing from 10 percent to 15 percent of caramel with the separated liquor, distilling the mixture of caramel and liquor at a temperature of about 102° C., until the aldehydes, ketones, acetone and other undesired volatile ingredients have been removed and aging the product.

SALADINE E. COLGIN.